March 6, 1962 R. E. BARR 3,023,889
APPARATUS FOR USE IN PREPARING DENTAL AMALGAMS
Filed May 5, 1958
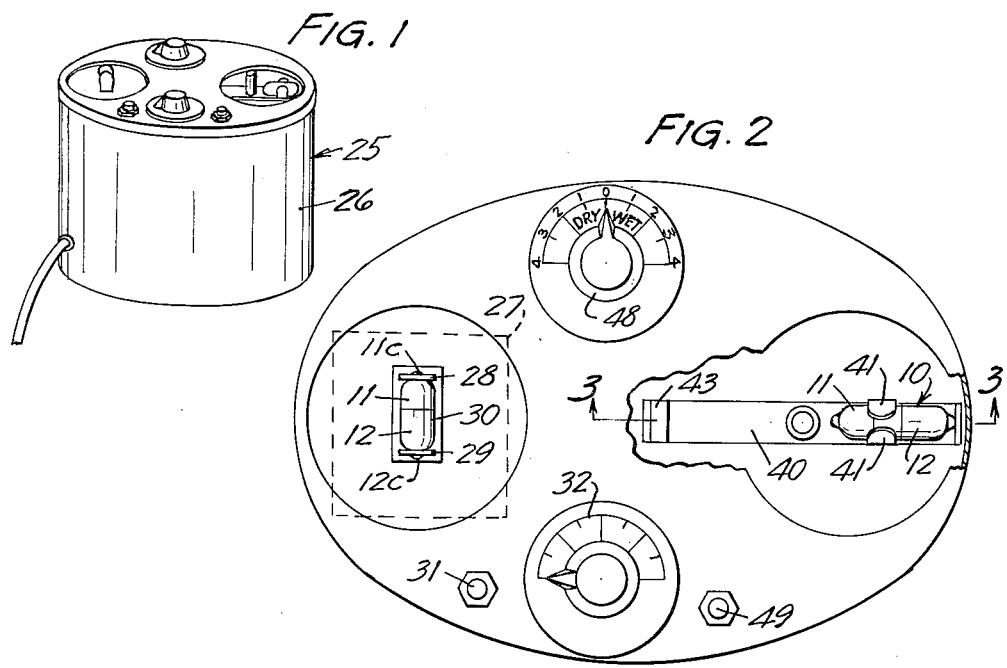
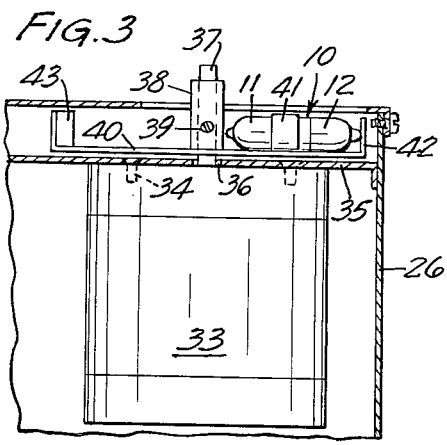
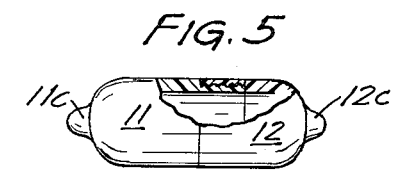
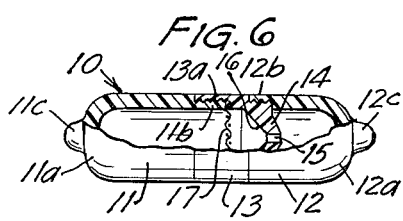
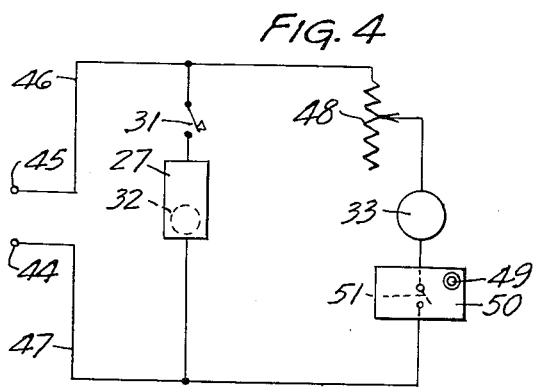
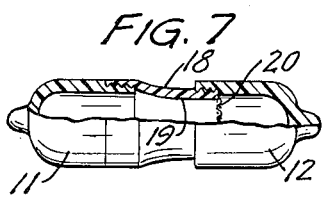
INVENTOR.
ROY E. BARR
BY
Williamson, Schroeder, Adams & Palmatier
ATTORNEYS 3,023,889
APPARATUS FOR USE IN PREPARING
DENTAL AMALGAMS
Roy E. Barr, 801 Commerce, Childress, Tex.
Filed May 5, 1958, Ser. No. 733,083
1 Claim. (Cl. 206—63.5)

This invention relates to the method of and apparatus for preparing dental amalgams.

An object of my invention is the provision of a new and improved method of preparing dental amalgams so that the resulting amalgams will have maximum uniformity in relation to each other and in relation to the particular type of amalgam which is desired.

Another object of my invention is to provide novel apparatus of simple and inexpensive construction and operation for use in preparation of dental amalgams.

Still another object of my invention is the provision of improved and novel apparatus for removing from a partially prepared amalgam, the mercury which is in excess to that which is desired or necessary so that the resultant amalgam contains only an amount of mercury within limits desired by dentists.

A further object of my invention is to provide new and novel apparatus for separating the free or excess mercury from the mercury which is necessary to coat the silver or silver alloy particles in an amalgam without causing loss of any portion of the actual amalgam by centrifuging the amalgam after the same has been partially prepared.

A still further object of my invention is the provision of an improved method, in the art of preparing dental amalgams, for removing excess mercury from a partially prepared amalgam and for causing a slight but desired variance in the consistency of one portion of the amalgam as compared to another portion of the amalgam.

These and other objects and advantages of my invention will more fully appear from the following description made in connection with the accompanying drawings wherein like reference characters refer to the same or similar parts throughout the several views and in which:

FIG. 1 is a perspective view of apparatus embodying means for carrying out the present invention;

FIG. 2 is a top plan view, partly broken away, of the apparatus shown in FIG. 1;

FIG. 3 is a detail section view taken on a substantially vertical plane as indicated at 3—3 in FIG. 2;

FIG. 4 is a schematic diagram of the electrical circuitry embodied in the apparatus shown in FIG. 1;

FIG. 5 is a side elevation view of one of the capsules which is shown partly in section;

FIG. 6 is a side elevation view, partly shown in section, of a capsule device embodying a portion of the present invention;

FIG. 7 is a view substantially similar to FIG. 6 and showing a slightly modified form of the capsule device.

Attention is first invited to the capsule assembly, indicated in general by numeral 10 and shown in detail in FIG. 6. The capsule assembly includes a pair of capsule end parts 11 and 12 which have closed outer ends 11a and 12a respectively and have open inner ends 11b and 12b which are respectively externally and internally threaded or machined to close tolerance and are adapted to interfit with each other in the manner shown in FIG. 5.

The capsule assembly 10 also includes a generally sleeved-type interconnection or insert 13, the opposite ends of which are internally and externally threaded for cooperative interfitting with the ends 11b and 12b of the capsule end parts 11 and 12.

Means are provided in the insert or interconnection 13 for permitting flow of liquid mercury from the capsule end part 11 to the capsule end part 12, and preventing passage of an amalgam pellet from the capsule end part 11 to the capsule end part 12. In the form shown, such means comprise a transverse wall 14 in the interconnection 13 having a central aperture 15 providing fluid communication therethrough. It will be noted that the wall 14 has a generally conical concave surface 16 with the aperture 15 disposed adjacent the apex of the conical surface. In the form shown in FIG. 6, the capsule assembly also has a nylon screen 17 disposed between the end annular surface of the capsule end part 11 and a shoulder surface 13a on the inner side of the insert 13. The screen 17 has such a fine mesh as to prevent particles of amalgam from passing therethrough, but the screen 17 will allow liquid mercury to pass therethrough. It should be recognized that because the screen 17 is constructed of nylon, it is flexible and is adapted to stretch at least slightly out of shape without displacement when the pellet of amalgam bears thereagainst under the influence of centrifugal force.

It is believed well to point out that the aperture 15 in the wall 14 is of such size as to prevent passage of an amalgam pellet therethrough and further is of such size as to prevent passage of the larger amalgam particles, which may split off from the pellet therethrough. It has been found that it is not necessary in all cases to use both the screen and the apertured wall 14 to entrap the amalgam pellet when centrifugal force is exerted thereagainst. It has been found possible to use either the screen 17 or the apertured wall 14 to produce the desired entrapment of an amalgam pellet and to permit passage of mercury into the capsule end part 12, where the mercury is captured and may be salvaged when the capsule is dissembled.

As seen in FIG. 7, the capsule end parts 11 and 12 are interconnected by a sleeve-type interconnection or insert 18 which has a tapering inner peripheral surface 19 which converges in the direction of the capsule end part 12 and toward the nylon screen 20 which is secured between the end of the insert 18 and the end of the capsule end part 12.

The apparatus, indicated in general by numeral 25 shown in FIGS. 1 to 4, is provided for the purpose of mixing a quantity of liquid mercury and silver for the production of amalgam, and for subsequently centrifuging the amalgam pellet to remove excess mercury from the pellet and to cause redisposition of free mercury in the pellet. In the form shown, the apparatus 25 includes a housing 26 enclosing a vibrator 27 which has leaf springs 28 and 29 for mounting a capsule 30 formed of the interfitted capsule end parts 11 and 12 which contain the desired quantities of liquid mercury and silver or silver alloy or the like. The operation of vibrator 27 is controlled by a switch 31 and by a rheostat control 32.

The apparatus 25 also includes a motor 33 secured as by screws 34 to a plate 35 which is affixed as by welding to the housing 26. The plate 35 is apertured at 36 and the motor spindle 37 projects through the aperture 36 and mounts a sleeve 38 which is affixed thereto as by set screw 39 and also carries a rotary arm 40 upon which a pair of spring clips 41 are affixed for holding the capsule assembly 10 which is oriented substantially radially of the shaft rotation axis. The outer end of arm 40 has a stop 42 thereon against which the end part 12 of capsule assembly 10 bears. The clips 41 and stop 42 hold the capsule assembly in predetermined position on the arm 40 so that the centrifugal force exerted on the contents of the capsule assembly will be varied only in relation to the rotary speed of the arm 40 and the motor spindle 37. The other end of arm 40 carries a counterweight 43 thereon for dynamically balancing the arm 40 when the same is revolved.

The motor 33 is of the variable speed type, depending upon the magnitude of the voltage applied thereto.

The electrical controls for the motor 33 are shown in the schematic in FIG. 4.

The terminals 44 and 45 will be connected to an electric power source which may be 110 volts A.C. Wire 46 is connected to the terminal 45 and wire 47 is connected to terminal 44. The motor 33 is connected through a rheostat 48 to the wire 46 and is connectible to the wire 47 through timer device 50 of conventional design which is started by a control 49 and which contains a switch 51 operated by the timing mechanism of the device 50 to open the motor circuit after a predetermined interval.

In operation, the capsule 30 including only the end parts 11 and 12 is charged with a quantity of mercury and silver or silver alloy or the like in predetermined proportions for the production of an amalgam. The capsule 30 is then applied between the holding springs 28 and 29 of the vibrator and the end lugs 11c and 12c are inserted into suitably provided apertures in the springs 28 and 29. The vibrator 27 is then operated to produce thorough mixing of the mercury with the silver or silver alloy particles.

The capsule 30 is then removed from the vibrator springs 28 and 29 and the capsule 30 is tipped so that the amalgam therein will be confined in the capsule end part 11. The insert 13 is then assembled with the capsule end parts in the manner shown in FIG. 6 and then the capsule assembly 10 is applied to the arm 40 to be held by the spring clips 41 and with the capsule end part 11 oriented inwardly toward the rotation axis and the capsule end part 12 oriented outwardly away from the rotation axis. The rheostat 48 is then adjusted to a predetermined position so as to cause, when the motor is subsequently energized, rotation of the motor at a predetermined speed.

After the rheostat 48 has been adjusted, the control is operated, which causes the motor circuit to be closed. The motor 33 continues to run until the timing device 50 causes opening of switch 51, which, when opened, causes deenergization of the motor 33.

While the motor 33 is operating, the arm 40 is rotated to exert a centrifugal force on the amalgam pellet within the capsule end part 11 so as to cause the amalgam pellet to bear against the nylon screen 17 which yields under the influence of the amalgam pellet and may conform substantially to the conical concave shape of the surface 16. The centrifugal force exerted on the amalgam pellet causes the free or excess mercury therein to flow outwardly toward the wall 14 and then through the aperture 15 therein. The screen 17 and wall 14 prevent any further outward movement of the amalgam pellet and the excess or free mercury which is separated from the amalgam pellet is collected in the capsule end part 12 so that this mercury may be saved and reused after being redistilled.

It has been found that by varying the speed of the motor 33 the quantity of mercury which is expelled from the amalgam pellet may be varied over a wide range. By way of example, it has been found that if the motor 33 is operated at a speed of 3300 r.p.m. for a five-second period, 21% of the mercury will be extracted; if the motor is run at 4000 r.p.m. for the same period 37% of the mercury in the amalgam pellet sample was removed; and when the motor is run at 4500 r.p.m. for the same period, 52% of the mercury in the pellet is extracted.

It will therefore be seen that the quantity of residual mercury in the amalgam pellet can be carefully controlled within the limits desired by dentists. In many cases, dentists prefer that the prepared amalgam contains 44 to 48% of residual mercury. Furthermore, it should be recognized that the mercury in the amalgam pellet is actually redisposed because the mercury flows from the inner end of the pellet to the outer end thereof with respect to the rotation axis. It is frequently desirable in using a quantity of amalgam that a certain portion of the amalgam be somewhat drier than other portions thereof and because the mercury in the amalgam pellet undergoes redisposition, certain portions of the amalgam in the pellet will be somewhat drier than other portions.

Although the capsule assemblies shown in the drawings provide interior wall surfaces which converge toward the amalgam pellet trap, it is within the scope of the present invention that the interior wall of the capsule assembly may diverge toward the trap. To arrange the interior capsule walls in this manner, would have the effect of causing a greater quantity of the amalgam in the pellet to remain in a slightly wetter state.

After the desired centrifuging is completed, the capsule assembly 10 is removed from the arm 40 and the parts of the capsule assembly 10 are disassembled from each other to permit the amalgam pellet to be removed and used.

It has been found that the capsule assembly 10 may be reused many times before any of the parts thereof need be replaced.

The novel method steps, comprising a portion of the invention, should be clear from the foregoing description.

It will be seen that I have provided a new and improved method of and apparatus for use in preparing an amalgam wherein the desired wetness of the amalgam is carefully controlled and furthermore, the mercury which is extracted from the amalgam pellet may be saved for reuse.

It will also be seen that by centrifuging the excess mercury from the amalgam by the method herein described, the person preparing the amalgam, such as the dentist, will not necessarily handle any free mercury which, over a period of time may constitute a health hazard to the person.

It will, of course, be understood that various changes may be made in the form, detail, ararngement and proportion of the parts without departing from the scope of my invention which consists of the matter described herein and set forth in the appended claim.

What I claim is:

In apparatus for use in preparing an amalgam, comprising a pair of capsule end parts each having an open inner end interfittable with the open end of the other capsule end part for defining an enclosed capsule, said end parts having interior walls in aligned edge-to-edge relation when the parts are assembled into a capsule, an open ended sleeve-type interconection having the open ends thereof interfitted with the open ends of the respective capsule end parts, a transverse wall secured in said interconnection and extending thereacross and having at one side thereof a substantially conical, concave surface, and said wall having an open aperture therethrough, substantially at the apex of the conical surface, whereby said surface of the transverse wall will retain an amalgam pellet which is thrust and urged thereagainst under influence of centrifugal force and including a yieldable screen within said sleeve-type interconnection and adjacent said surface of the transverse wall, whereby to retain loose particles from the amalgam pellet and prevent the same from passing through the aperture and allow passage of free mercury through the aperture and including a yieldable screen within said sleeve-type interconnection and adjacent said surface of the transverse wall whereby to retain loose particles from the amalgam pellet and prevent the same from passing through the aperture.

References Cited in the file of this patent

UNITED STATES PATENTS

| | | |
|---|---|---|
| 1,774,258 | English | Aug. 26, 1930 |
| 2,048,966 | Perry | July 28, 1936 |
| 2,110,237 | Parsons | Mar. 8, 1938 |
| 2,315,415 | Gilbert | Mar. 30, 1943 |
| 2,354,402 | Petruccione et al. | July 25, 1944 |
| 2,492,326 | Scotti | Dec. 27, 1949 |
| 2,527,991 | Greenberg | Oct. 31, 1950 |
| 2,527,992 | Greenberg | Oct. 31, 1950 |
| 2,795,850 | Harvey | June 18, 1957 |
| 2,799,935 | Hall | July 23, 1957 |